(12) United States Patent
Rossi et al.

(10) Patent No.: US 7,483,880 B2
(45) Date of Patent: Jan. 27, 2009

(54) USER INTERFACE FOR DATABASE DISPLAY

(75) Inventors: Robert Rossi, Bellevue, WA (US); Trent Swanson, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 10/955,500

(22) Filed: Sep. 30, 2004

(65) Prior Publication Data

US 2006/0069694 A1 Mar. 30, 2006

(51) Int. Cl.
G06F 17/30 (2006.01)
(52) U.S. Cl. ............... 707/3; 707/1; 707/2; 707/4; 707/5; 707/6; 707/7
(58) Field of Classification Search ............ 707/3, 707/200, 5, 102, 201, 4; 345/440; 715/854; 705/3; 706/934
See application file for complete search history.

(56) References Cited

U.S. PATENT DOCUMENTS

| | | | |
|---|---|---|---|
| 5,604,854 A * | 2/1997 | Glassey .................. 715/503 |
| 5,918,232 A * | 6/1999 | Pouschine et al. ....... 707/103 R |
| 6,055,369 A * | 4/2000 | Sawahata et al. ........... 717/109 |
| 6,177,936 B1 * | 1/2001 | Cragun .................. 715/760 |
| 6,298,342 B1 | 10/2001 | Graefe et al. |
| 6,301,575 B1 | 10/2001 | Chadha et al. |
| 6,411,313 B1 | 6/2002 | Conlon et al. |
| 6,434,545 B1 | 8/2002 | MacLeod et al. |
| 6,535,872 B1 | 3/2003 | Castille et al. |
| 6,546,545 B1 * | 4/2003 | Honarvar et al. ............ 717/100 |
| 6,553,359 B1 | 4/2003 | Schwenkreis |
| 6,604,095 B1 | 8/2003 | Cesare et al. |
| 6,626,959 B1 | 9/2003 | Moise et al. |
| 6,691,282 B1 * | 2/2004 | Rochford et al. ........... 715/234 |
| 6,707,454 B1 * | 3/2004 | Barg et al. .................. 345/440 |
| 6,744,449 B2 | 6/2004 | MacLeod et al. |
| 6,750,864 B1 | 6/2004 | Anwar |
| 6,829,615 B2 * | 12/2004 | Schirmer et al. ............ 707/102 |
| 6,915,289 B1 * | 7/2005 | Malloy et al. ................. 707/2 |
| 7,017,123 B2 * | 3/2006 | Chickles et al. ............. 715/816 |
| 7,181,465 B2 * | 2/2007 | Maze et al. .............. 707/104.1 |
| 2002/0030703 A1 * | 3/2002 | Robertson et al. ........... 345/853 |
| 2002/0069215 A1 * | 6/2002 | Orbanes et al. ............. 707/500 |
| 2002/0116417 A1 * | 8/2002 | Weinberg et al. ........... 707/517 |

(Continued)

OTHER PUBLICATIONS

Eick, Visualizing Multi-Dimensional Data, Computer Graphics, Feb. 2000, pp. 61-65.

(Continued)

*Primary Examiner*—Apu M Mofiz
*Assistant Examiner*—Hung D Le

(57) ABSTRACT

A computer system may include a display and a user interface selection device. The computer system may display a first set of data associated with a first index of a data store in a first frame, and may receive a first selection signal indicative of the user interface selection device selecting a first item of the first set of data. In response to the first selection signal, the computer system may retrieve a second set of data from the data store associated with a second index of the data store, the second set of data being associated with the first item. The computer system may display the second set of data in a second frame distinct from the first frame.

75 Claims, 7 Drawing Sheets

U.S. PATENT DOCUMENTS

| | | | |
|---|---|---|---|
| 2003/0058286 A1* | 3/2003 | Dando | 345/853 |
| 2003/0131007 A1* | 7/2003 | Schirmer et al. | 707/100 |
| 2003/0187716 A1 | 10/2003 | Lee | |
| 2003/0229635 A1 | 12/2003 | Chaudhuri et al. | |
| 2004/0122820 A1 | 6/2004 | Malloy et al. | |
| 2004/0122844 A1 | 6/2004 | Malloy et al. | |
| 2004/0239701 A1* | 12/2004 | Crichton | 345/853 |

OTHER PUBLICATIONS

Gebhardt, A Toolkit for Negotiation Support Interfaces to Multi-Dimensional Data, ACM SIGMOD Int'l Conf. on Mgt of Data, 1997, pp. 348-356.

Grinstein, Visualizing Multidimensional (Multivariate) Data and Relations—Perception vs. Geometry, 6th IEEE Visualization Conference, 1995, pp. 405-411.

Hsieh, Vite: A Visual Interface Supporting the Direct Manipulation of Structured Data Using Two-Way Mappings, 5th Int'l Conf. on Intelligent User Interfaces, 2000, pp. 141-148.

Jankun-Kelly, A spreadsheet Interface for Visualization Exploration, IEEE Conf. on Visualization, 2000, pp. 69-76.

Pook, Context and Interaction in Zoomable User Interfaces, Working Conf. on Advanced Visual Interfaces, May 2000, pp. 227-231.

Stolte, Polaris: A System for Query, Analysis, and Visualization of Multi-Dimensional Relational Databases, IEEE Symposium on Inf. Visualization, 2000, pp. 5-14.

Tory, Combining 2D and 3D Views for Orientation and Relative Position Tasks, Conf. on Human Factors in Computing Systems, 2004, pp. 73-80.

* cited by examiner

USER INTERFACE FOR DATABASE DISPLAY

TECHNICAL FIELD

The present application relates to a user interface, and more specifically, to a user interface for a database display.

BACKGROUND

Database displays typically take the form of tables with multiple columns and rows, which can be very large depending on the size and dimension of the underlying data. The displayed multiple columns and rows are typically viewed in a single frame and the user can scan the data extending beyond the edges of the frame by scrolling or paging through the data. A user may also select and/or constrain rows and or columns for display through manipulation of the data in a spreadsheet or application of a query against the database.

At the same time, the computer languages most often used for such applications, particularly in the relational database context, require textual input to define a query against a database or reliance on menus and/or buttons to select predetermined queries. In particular, Structured Query Language (SQL) and similar query languages comprise high level commands, often referred to as "queries," which typically describe a data set to be retrieved, selected or otherwise processed. Such programming environments allow the specification of data selection using constructs similar to other query languages, natural English, and/or logic functions.

SUMMARY

The following presents a simplified summary of the disclosure in order to provide a basic understanding to the reader. This summary is not an exhaustive or limiting overview of the disclosure. The summary is not provided to identify key and/or critical elements of the invention, delineate the scope of the invention, or limit the scope of the invention in any way. Its sole purpose is to present some of the concepts disclosed in a simplified form, as an introduction to the more detailed description that is presented later.

As technology progresses, many small form devices, e.g., hand-held devices, lap top devices, programmable consumer electronics, cellular telephones, digital cameras, and the like, are supporting smaller displays and/or more limited function user input devices. On smaller display sized devices, presenting large amounts of data in an easy to understand interface which retains a context for data drill down may be a challenge. Moreover, finding the desired data may be difficult since user input devices may be limited to simple preset menu driven searches and/or small keyboard or digital pen initiated text input queries.

The present application assists display of data from a database by displaying each set of data, such as a dimension or index of a multidimensional database, in a distinct container. Each container may be modified in size to allow the user to adjust the display of hierarchical and/or multidimensional data.

The data displayed in each container may be constrained and/or adjusted through a graphical user interface. For example, additional queries and/or query constraints may be generated through a selection of one or more displayed items in a container, with each subsequent query result being displayed in a distinct container. More particularly, selection of a displayed item in one container may automatically generate a query to retrieve results related to the selected entry.

A user may pivot the data displayed in the containers by adjusting the relative position or other indication of primacy of the displayed container. For example, the position, such as from top to bottom, may indicate the primacy of each constraint operator on the data, e.g., a first container may display a list of activities, a second container may display tasks related to the selected activity in the first container, and a third container may display personnel related to the selected task in the second container. However, after finding the desired personnel related to a specific task, the user may desire to review all of the projects and/or tasks associated with that selected person. Accordingly, the user may pivot the data to retrieve projects and tasks associated with the selected user. As described further below, the user may move or adjust the position of the containers to place the third container before the other containers, and in this manner determine the pivot, filter, and constraint definition of the data displayed in each container.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A database may be any kind of database or store, including a relational database, object-oriented database, unstructured database, an in-memory database, or other database. A database may be constructed using a flat file system such as ACSII text, a binary file, data transmitted across a communication network, or any other file system. Notwithstanding these possible implementations of the foregoing databases, the term database as used herein refers to any data that is collected and stored in any manner accessible by a computer.

Databases may associate one or more records with other records. For example, a hierarchical data store may associate records in groups in such a way that their relationships form a branching, tree-like structure. In another example, a multi-dimensional database may be organized by two or more dimensions or indices. With two dimensions, the data may be structured as an array with rows and columns. With three or more dimensions, the multi-dimensional data may be structured as a cube in which each dimension, or group of dimensions, forms an edge of the cube. Accordingly, an index or dimension represents a perspective of the contents of a database. Moreover, a hierarchy may be associated with a dimension of a database. Dimensions may act as indices for identifying a particular data item or range of data items within a database.

Figure 1:
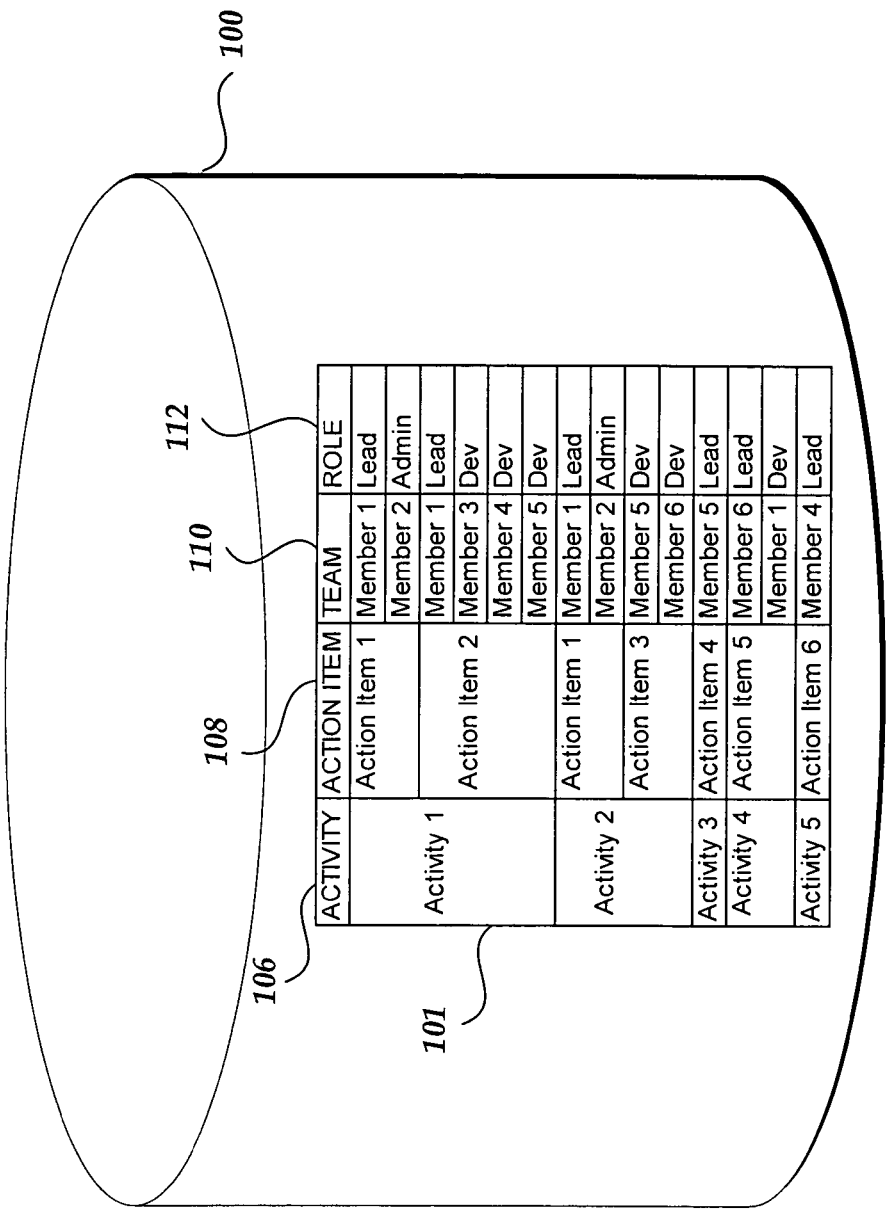
FIG. 1 is a schematic illustration of a database in one embodiment.

FIG. 1 is a schematic illustration of an example table 101 representing a relational database 100. Although the following example is described with reference to a single table, it is to be appreciated that any form or structure of the data store may be suitable, such as a hierarchical tree, a data cube, a spreadsheet, and the like, and any combination of structures may be suitable such as multiple data tables, a multidimensional data structure with a hierarchical relationship, and the like. Moreover, although database 100 is shown with indices and data items related to project management, it is to be appreciated than any data and/or index type may be used as appropriate for the application.

The table 101, representing data in database 100, may contain any number of columns and rows as suitable, with entries or items in the database being formed at the intersection of a column and row. As shown in FIG. 1, the table 101 may contain 4 columns.

Column 106 contains data items pertaining to an activity, column 108 contains data items pertaining to action items, column 110 contains data items pertaining to team members, and column 112 contains data items pertaining to the role of a team member.

The indices or dimensions of the database 100 may organize or associate data items in a hierarchy. In some cases the hierarchy may be inherent in the indices, for example, project, action, members, or alternatively, the hierarchy may be explicit within the relationships stored between the objects. For example, a particular activity of column 106 may be associated with particular action items from column 108, each action item may be associated with one or more team members to accomplish that task as shown in column 110, and each team member may be assigned a role for that action item as shown in column 112. Accordingly, the initial or primary dimension of the database may organize activities by action items, the next dimension may organize the team members by activity, and the next dimension may organize the roles by team member. Moreover, the activity, action item, team member grouping may form a hierarchical database with the activity being at the top tier, the action item at the top middle tier, the team members at the bottom middle tier, and the role at the bottom tier. In this manner, the activity dimension may be the primary index, since it is the initial constraint on how to organize the data shown in table 101.

Figure 2:
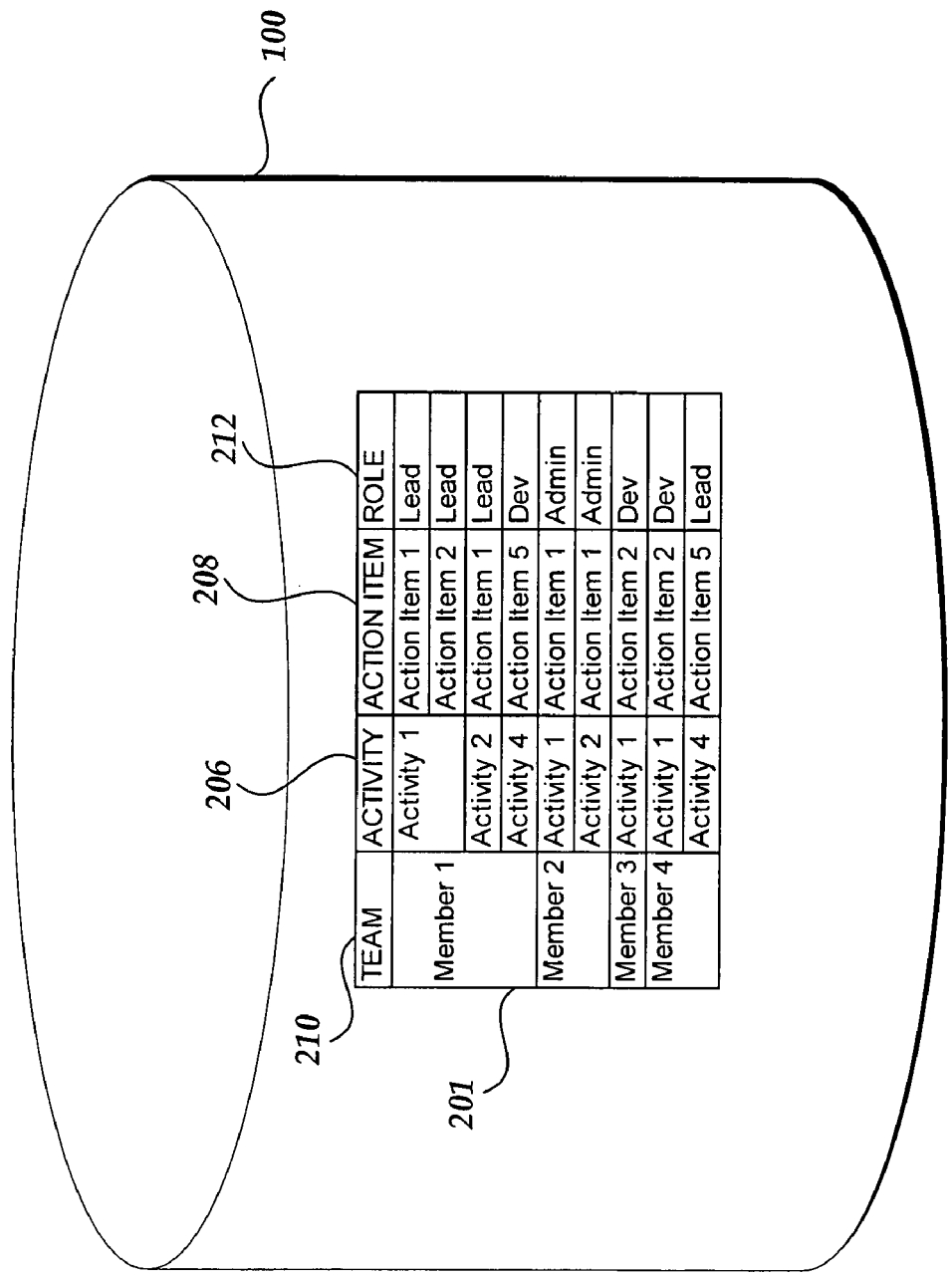
FIG. 2 is another schematic illustration of the database of FIG. 1.

Any column of the database 100 may act as a primary dimension or index for organizing the items in a database. For example, as shown in FIG. 2, the database 100 may be pivoted to form a table 201 with the same columns; however, the primary or initial dimension of the data items may be the team member column 210, followed by the activity column 206, the action column 208, and the role column 212. In this manner, manipulation of the dimensions of the data allows a user to focus and/or sort the data to drill down the database for a desired item. One example of pivoting a database is provided by PivotTable® dynamic data displays of the Excel® spreadsheet program, both available from Microsoft Corporation of Redmond, Wash. PivotTable® dynamic data displays are discussed more fully in U.S. Pat. No. 6,411,313, which is incorporated by reference herein.

The items stored in a database are typically accessed by way of a user-defined query that is constructed in a query language, such as Structured Query Language (SQL). Generally, such queries are generated and submitted to the database through a user interface display which allows for textual input. The query engine may compute the complete query expression and provide the filtered results in graphical display, such as a frame or other container.

Query results from a database may be presented to a user in many formats, including list displays, row and column delimited displays, tables, and the like. In each case, the entire query result is typically contained in a graphical user interface container. A container is a border or some other appropriate display delimiter which separates the displayed data from other displayed objects. The container may be individually movable relative to other objects displayed on the display device, such as a monitor. In some cases, the container may be a frame which includes a border surrounding the displayed data entries, a title bar at the top of the frame, a scroll bar indicator, and a frame minimizer selector. One example of a frame may be compatible with the Windows® graphical user interface software available from Microsoft Corporation. A displayed frame for an application may include secondary frames, or enclosed child windows, which depict the content of various files that are handled by the associated application.

Figure 3:
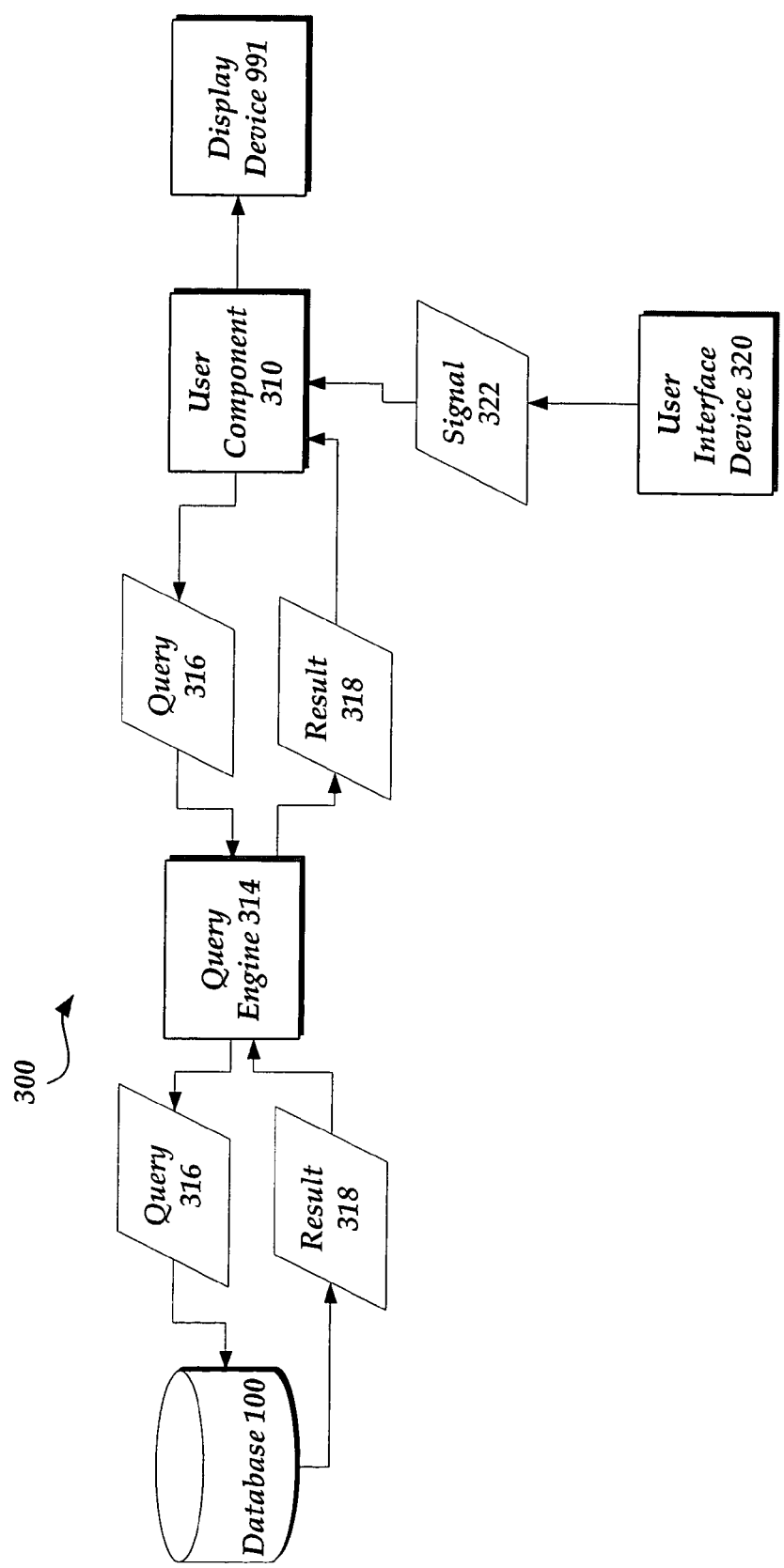
FIG. 3 is an example functional diagram of a display system for the database of FIG. 1 in one embodiment.

FIG. 3 schematically illustrates an example display system 300 for providing user access to the contents of a database 100. The display system 300 may include a user component 310 which provides a graphical user interface to the user to accept query parameters and/or other search constraints for computing desired data to be displayed. The query 316 may be generated by the user or may be automatically generated in response to some action or indication from the user and/or the user component. The query 316 is sent to the query engine 314 which computes the required information from the data in the database 100, and sends the query results 318 to the user component 310 for display to the user.

The database 100, query engine 314, and user component 310 of FIG. 3 may reside on the same computer system. Alternatively, the database 100 may reside on a separate computer system accessed by the user component. To decrease response time and/or function in an unlinked environment, all or a portion of the database may be down loaded to the computer system of the user component, such as to associative memory. The user component may down load all or a portion of the database from time to time, such as opportunistically, to update the local database and allow access to data.

Figure 4:
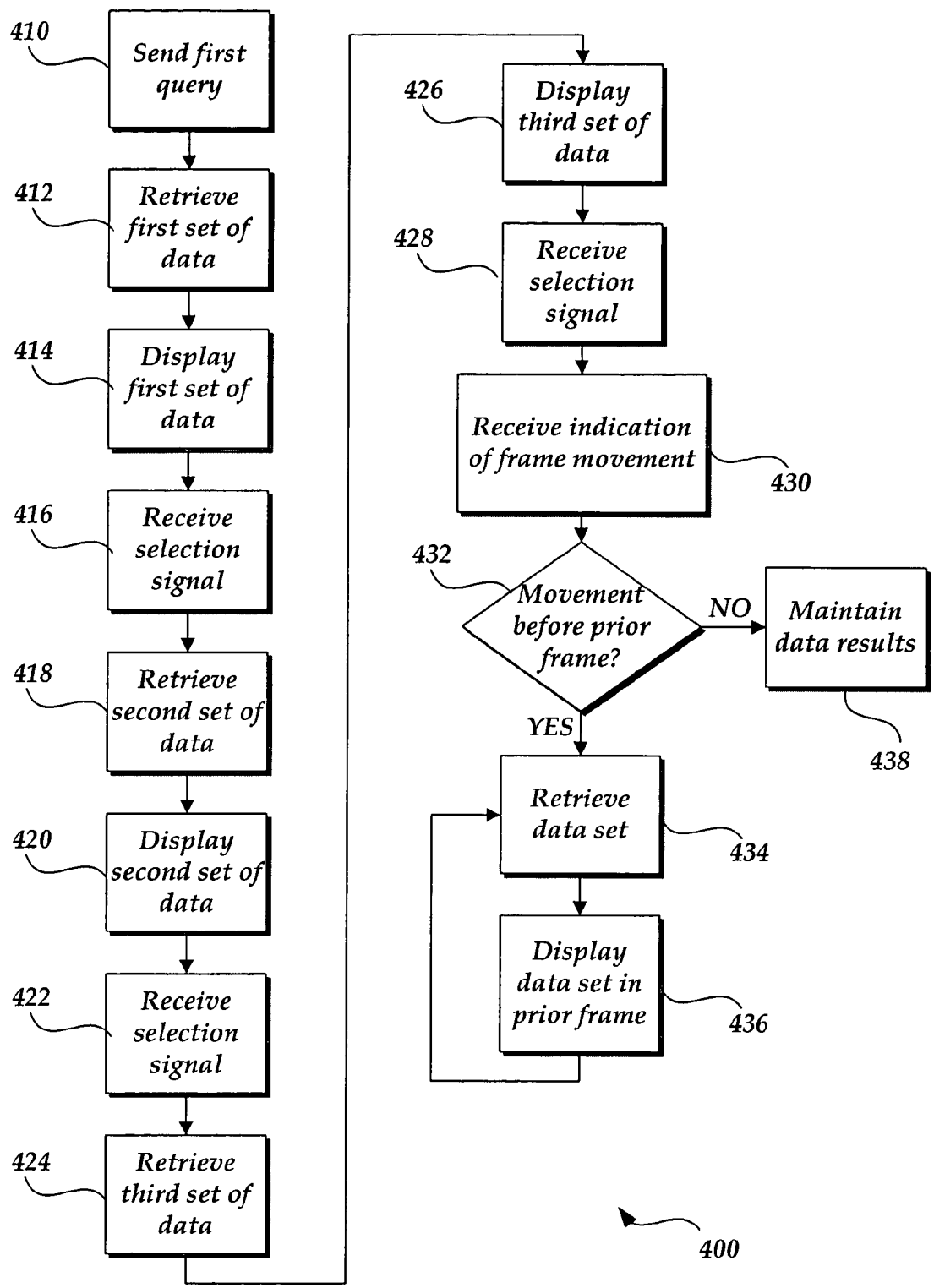
FIG. 4 is a flow chart of an example method implementing the display system of FIG. 3 in one embodiment.

One example method 400 of displaying database query results is illustrated in FIG. 4 with reference to the example display system of FIG. 3. Initially, the user may initiate the user component 310 and send 410 a query 316 to the query engine. The query 316 may be automatically generated at initialization of the user component. For example, at initialization, the user component 310 may generate a query to retrieve data associated with a predetermined index of the database 100 which may be the index at the highest level of the database hierarchy or a primary index defined by the user. Alternatively, the user may indicate the query 316 through inputting a text string indicating the desired primary index and/or other query parameters and/or selecting an available option to retrieve a predetermined query such as a button, menu, list, or any other suitable selector to generate a query based on an index of the desired items. In one example, a user may select from a menu one or more indices for display. If one index is selected, the user component may generate an appropriate query for data associated with that index and send the query 316 to the query engine.

In response to the query 316, the query engine 314 of FIG. 3 may retrieve 412 the appropriate data items from the database 100 and forward the results 318 to the user component. As shown in FIG. 4, the query result, e.g., the data items satisfying the query 316, may be formatted and displayed 414 on a display such as a monitor for review by the user. The results may be contained in a container, and in the example display shown in FIG. 5, the container is a frame 500 compatible with a Windows.RTM . graphical display.

Figures 5, 6:
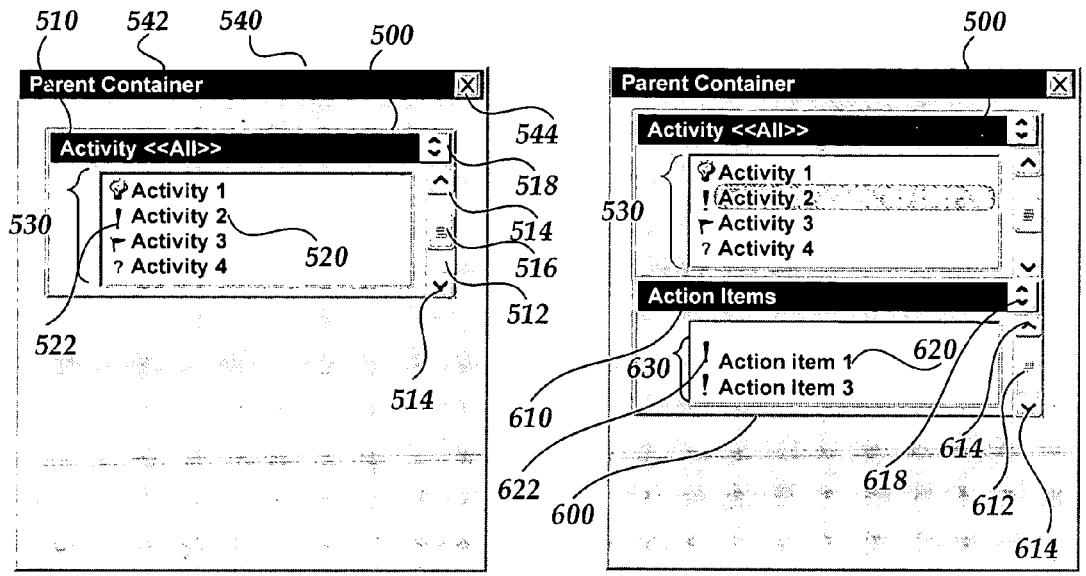
FIG. 5 is an example display of a query result of the display system of FIG. 3 in one embodiment.
FIG. 6 is another example display of a query result of the display system of FIG. 3 in one embodiment.

The frame 500 may include a title bar 510 indicating a title of the query results and may reflect the query parameter(s) used to compute the query result. As shown in FIG. 5, the title bar 510 may indicate the index or dimension title of the displayed data items, e.g., 'Activities' of the database 100 of FIG. 1. The title bar 510 may also include a frame minimizer selector 518, such as a button or other appropriate selector, which allows a user to decrease the size of the frame. The container for the query result, as a frame 500, may also include a scroll bar indicator 512. The scroll bar indicator may be in shadow if the entire query result may be displayed within the real estate allocated to the container 510. Alternatively, the scroll bar indicator 512 may be active with an elevator button 516, page up/down buttons 514, and/or beginning/end buttons which may allow a user to scroll or page through the items listed in the frame 500 but extending beyond the real estate of the displayed frame.

The frame 500 may be contained and/or associated with an application or parent container 540 of the user component, such as an application frame. The parent container 540 may include a menu bar 542, a frame close selector, 544, or any other appropriate menu, tool bar, and/or selector. As shown in FIG. 5, the parent container, which may be associated with a user component application, may completely enclose the child frame 500 containing the query results.

The frame 500 contains the graphical and/or textual representation of the query results. As shown in FIG. 5, the query results may be a list 530 of items satisfying the query, which in the example shown, may have been an indication of the index 'Activities' of the database 100 shown in FIG. 1. The items listed in the frame 500 may include a textual representation 520 and/or a symbolic or iconic representation 522 of the listed item. If no other query parameters were indicated in the query 316, the resulting list 530 may be all items associated with the indicated query parameter, e.g., index 'Activities.' Alternatively, the query results may be modified automatically by modifying the query 316 and/or retrieved results 318 to display only those items satisfying the query and also associated with a predetermined query parameter, such as an association with the user. For example, the user component may display only those Activity items in the frame 500 which are associated with the user, e.g., those activities of which the user is a member. Additionally, the query items may be further constrained by other query parameters predetermined by the user. For example, the user may provide a query parameter indicating a particular range of values, categorical limitations, or any other suitable constraint.

To drill down into the database 100, a user may use a user interface selection device, such as a mouse, electronic pen, or voice command, to select a particular item displayed in the frame 500. Referring to FIGS. 3-4, the user component 310 may receive 416 a selection signal 322 from the user interface selection device 320 of an item listed in frame 500. For example, a user may use a mouse to point and click on an item listed in the container, or may use any other suitable method to indicate a selection of a listed item. The selected item may be indicated in frame 500 in any appropriate manner, such as by highlighting the background of the item in a contrasting color, bolding the textual representation 520, or in any other suitable manner. In the example query result illustrated in FIG. 5, a user may select 'Activity 2' 520 and/or may select the Activity 2 icon 522. In response to the selection signal, the user component may automatically generate a query 316 and send the query to the query engine. The query 316 may indicate the selected item as a query parameter as well as may automatically generate a query parameter based upon a predetermined parameter which may be pre-selected by the user in a set up of the user component and/or database, or may be the next index in the database 100 and/or the next tier down in a hierarchical database. In the database shown in FIG. 1, the next tier down in the hierarchy is the 'Action Item' index 108. Alternatively, the additional query parameters may be indicated by the user through any appropriate method, such as a menu, dialog, and the like. In response to the second query 316, a query result may be retrieved 418 from the database (or local memory as appropriate) including items associated with the selected item in the frame 500 and the additional query parameter such as another index of the database.

In another example, the user may pre-select the additional query parameter for the second query through the initial query. For example, the initial query generated by a user may contain more than one query parameter, such as an indication of more than one index. In this manner, the user component and/or query engine may display results satisfying the first query index and may reserve additional indications of indices for subsequent queries to be shown in subsequent containers. More particularly, the initial query may indicate the Activity index, the Action Items index, and the Team Members index. However, frame 500 may display only those items associated with the first indicated index, e.g., the 'Activities' index. The additional indicated indices, e.g., the Action Items index and the Team Members index may be reserved for additional queries. Alternatively, the initial query 316 to the database 100 may be incrementally computed and a complete query result returned to the user component. The user component may then modify the display of the query result in the first frame 500 to display only those items associated with the first indicated index and reserve the additional items associated with other indices for subsequent query indications from the user. For example, upon receiving the selection signal indicating selection of an item in the frame 500, the user component may retrieve the appropriate results related to the selected item and the next index of the initial query, e.g., the Action Items index.

As shown in FIG. 4, the query result, e.g., the data items associated with the selected entry and the indicated index may be formatted and displayed 420 on a display such as a monitor for review by the user. The results may be contained in a container, and in the example display shown in FIG. 6, the container is a frame 600 compatible with Windows® graphical display.

The frame 600 may include a title bar 610 indicating a title of the query results and may reflect the query parameter(s) used to compute the query result. As shown in FIG. 6, the title bar 610 may indicate the index or dimension title of the displayed data items, e.g., 'Action Items' of the database 100 of FIG. 1. The title bar 610 may also include a frame minimizer selector 618, such as a button or other appropriate selector, which allows a user to decrease the size of the frame. The container for the query result, as a frame 600, may also include a scroll bar indicator 612. The scroll bar indicator may be in shadow if the entire query result may be displayed within the real estate allocated to the container 600. Alternatively, the scroll bar indicator 612 may be active with an elevator button 616, page up/down buttons 614, and/or beginning/end buttons which may allow a user to scroll or page through the items listed in the frame 600 but extending beyond the real estate of the displayed frame. The frame 600 may be contained and/or associated with the application or parent frame 540 of the user component, such as an application frame.

The frame 600 may be associated with the frame 500 by the user component. For example, available real estate within the parent frame 540 may be partitioned between the first frame 500 and the second frame 600. Moreover, the second frame 600 may be associated with the first frame 500 as a stackable container. More particularly, the horizontal size of the second frame may be associated with the horizontal size of the first frame, such that when the horizontal dimension of either frame 500, 600 is modified by the user, the horizontal dimension of both frames 500, 600 is modified. As stackable containers, frames 500, 600 may be positioned adjacent and on top of each other as shown in FIG. 6. Although frame 600 may be associated with frame 500, the border or other frame delimited may indicate that frame 600 is distinct or independently modifiable relative to frame 500.

The context of the drill down of the data may be indicated by the displayed position of the frames 500, 600. For example, as shown in FIG. 6, the second frame 600 may be positioned below the first frame 500 to indicate that the data is drilling 'down' into the data items of the database 100 and/or to indicate the retrieved order of the results 530, 630. It is to be appreciated that any appropriate relative position of the frames 500, 600 may indicate the order of the queries, hierarchy of the associated indices, and the like. For example, the frames 500, 600 may be positioned adjacent to on another in a horizontal configuration, overlapped with the top window indicating the most recent query, and any other suitable relative positioning of the frames.

Figures 7, 8:
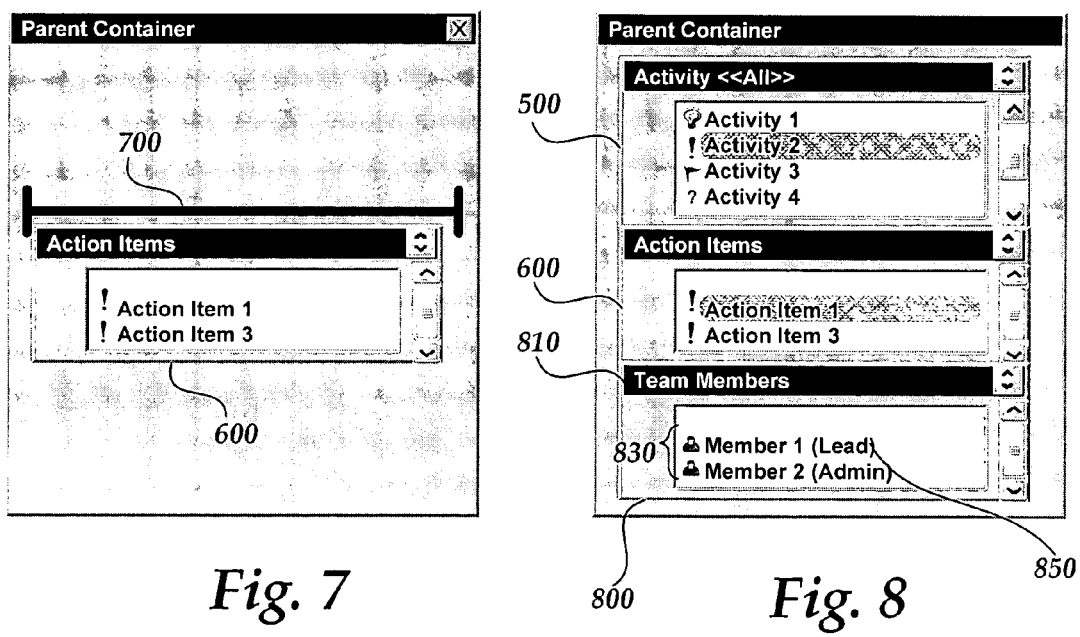
FIG. 7 is another example display of the query result of FIG. 6 in one embodiment.
FIG. 8 is yet another example display of a query result of the display system of FIG. 3 in one embodiment.

To conserve real estate used by the frames 500, 600, the first frame 500 may be automatically reduced in size. For example, upon selection of an item in the frame 500, frame 500 may be automatically reduced in size to exclude display of unselected items of the retrieved query result 530. In this manner, frame 500 may display only the selected item which may reduce the vertical dimension of the frame 500 and may retain or reduce the horizontal dimension of the frame 500. Alternatively or additionally, frame 500 may be reduced in size to display only the title bar 510 of the frame 500 to retain the context of the query order, e.g., the indication of the index and/or other query parameters of the initial query result. In another example, frame 500 may be completely minimized and may be indicated by any suitable frame indicator such as an icon in an active frame bar at the bottom of the screen or a frame indicator 700 such as a bar, line, or icon within the parent frame 540 and at the relative position of the frame 500 as shown in FIG. 7.

Any of the displayed frames 500, 600 may be manually minimized by the user by manipulation of the size of the frame, e.g., dragging a corner of the frame, and/or activation and or selection of the frame minimizer selector 518, 618. For example, the frame minimizer selector may indicate that the frame size may be increased by a predetermined amount with an up chevron and/or that the frame size may be decreased by a predetermined amount with a down chevron, as shown in FIG. 6. A first activation of the down chevron 518 may decrease the size of the frame 500 to display only the selected item in that frame. A further selection of the down chevron 518 may reduce the size of frame 500 to display only the title bar 510 of the frame 500. A further selection of the down chevron may reduce the size of the frame 500 to the super-minimized size of the icon at the position of the frame 500, as shown in FIG. 7. It is to be appreciated that any suitable selector and/or order of frame minimization may be appropriate and may be selected through any appropriate method or selector.

The frame 600 contains the graphical and/or textual representation of the query results similar to that described above with reference to frame 500. As shown in FIG. 6, the query results may be a list 630 of items of an indicated index satisfying the query, which in the example shown, may have been an indication of the index 'Action Items' of the database 100 shown in FIG. 1 and the selected item 520. The items listed in the frame 600 may include a textual representation 620 and/or a symbolic or iconic representation 622 of the listed item. If no other query parameters were indicated in the query 316 beyond the indicated index, the resulting list 630 may be all items associated with the indicated query parameter, e.g., index 'Action Items' and the selected item in frame 500. In this manner, the listed items 630 may include only those Action Items associated with the Activity item selected in frame 500.

As noted above, the user may predetermine or indicate in the initial query the order of the indexes to be retrieved. For example, based upon a query indicating multiple indices and/or a predetermined hierarchy, the user component may automatically generate the listed items 630 and display those results in the frame 600 without a selection of an item in the frame 500. In this manner, the listed items in the frame 600 may include all items associated with the second index, e.g., the Action Items index, and optionally also meeting additional query parameters, such as range limitations, user associations, and the like.

To further drill down into the database 100, a user may use a user interface selection device to select a particular item displayed in the frame 600. Referring to FIGS. 3-4, the user component 310 may receive 422 a selection signal 322 from the user interface selection device 320 of an item listed in the second frame 600. For example, a user may use a mouse to point and click on an item listed in the container 600, or may use any other suitable method to indicate a selection of a listed item. In the example query result illustrated in FIG. 6, a user may select 'Action Item' 620 and/or may select the Action Item 1 icon 622. In response to the selection signal, the user component may automatically generate a query 316 and send the query to the query engine. The query 316 may indicate the selected item as a query parameter as well as may automatically generate a query parameter based upon a predetermined parameter, which as noted above, may be pre-selected by the user in a set up of the user component and/or database, may be the next index in the database 100, the next tier down in a hierarchical database, indicated by the user in the initial query, or in any other suitable manner. In the database shown in FIG. 1, the next tier down in the hierarchy is the 'Team Member' index 110. In response to the third query 316, a query result may be retrieved 424 from the database including items associated with the selected item in the frame 600 and the additional query parameter such as another index of the database.

As shown in FIG. 4, the query result, e.g., the data items associated with the selected entry and the indicated index, may be formatted and displayed 426 on a display such as a monitor for review by the user. The results may be contained in a container, and in the example display shown in FIG. 8, the container is a frame 800 compatible with a Windows® graphical display.

As noted above, the user component may display the third frame 800 without any selection of an item in the second frame 600. For example, the user may have indicated an index query parameter in the initial query, as a predetermined hierarchy within the user component and/or database, through a menu, and/or any other suitable manner. In one example, if no item is selected in the second frame 600, the frame 800 may display all items associated with the indicated index, e.g., Team Members, available in database 100. Alternatively, the list 830 of resulting items may be constrained to those Team Members associated with the Action Items listed in the second frame 600, e.g., those Action Items related to the Activity selected in the first frame 500, and/or may be constrained by any other suitable query parameter such as the Activity selected in the first frame 500, Team Members associated with the user, and the like.

The third frame 800 may be associated with the first and/or second frames, such as a stackable container, as noted above. Moreover, display real estate to the open frames may be further divided between the open frames as noted above, by minimizing, super-minimizing, and/or modifying the size of the active frames.

The user may continue to drill down into the data by selecting further entries in the third frame 800 and/or requesting that additional data associated with additional indices be displayed. For example, as shown in FIG. 8, the Team Member items displayed in frame 800 may also indicate other data items, such as the role of each team member. Such additional data items may be indicated in the initial query, a subsequent query, predetermined by the user, and the like. Alternatively, other indices of items may be displayed in subsequent frames, in a manner similar to that noted above.

In operation, a user may initiate the user component and retrieve a list of items pertaining to a first index of a database. As noted above, the list of items may be all items related to the indicated index or only a portion of the items, which may be constrained by query parameters indicated by the user, user component, and/or query engine. To drill down into the data, the user component may open additional, subsequent containers, with each succeeding container listing all or a portion of the items related to succeeding indices of the database. In this manner, the user may drilldown into the data while retaining a context of the path traveled to achieve that data. The user may save the contents of an indicated container for future review. The user may also save the other displayed container contents to retain a context for the saved contents of the indicated container. The saved contents may be stored in any appropriate manner and may be associated with the appropriate container in memory.

As noted above, the user may wish to view data in a different context or order. Thus, a user may wish to pivot the data items about an index to view the items in a different order and/or retrieve other items related to the new context. Rather than generating a pivot table or additional query stream to drill down in the data, the user may indicate the desired pivot index by selecting an index displayed in one of the containers.

Figure 9:
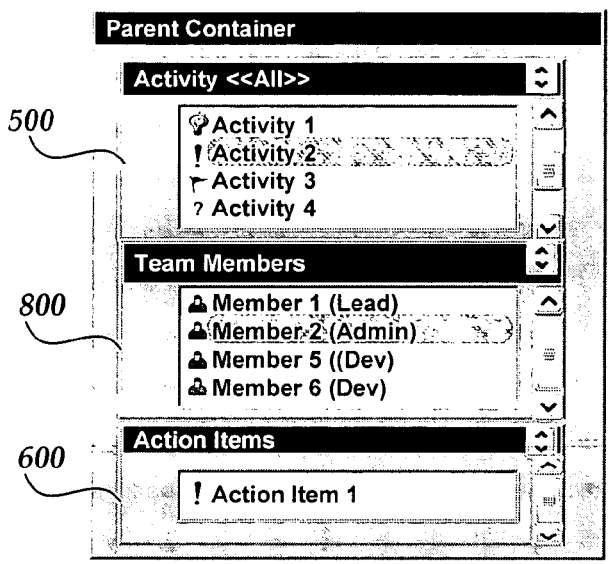
FIG. 9 is an example display of a pivoted query result of the display of FIG. 7 in one embodiment.

For example with reference to FIG. 8, the user component may display the Activity frame 500, the Action Item Frame 600, and Team Member frame 800, allowing the user to drill down from a desired Activity, to a desired task or Action Item, to a desired Team Member with whom the user wishes to contact for more information. However, the user may have other topics to discuss with the desired Team Member related to the same selected Activity. To find those tasks in the displayed frames, the user may reselect each Activity and/or Action Item to determine which Action Items are within the Team Member's domain, or generate a new series of containers drilling down from the Team Member list to an Activity list, to an Action Item list. As an alternative, the user may indicate the desired data pivot index by moving the Team Member container 800 before the Action Item container 600, as shown in FIG. 9.

More generally, to indicate a desired pivot index for displayed data items, a user may use a user interface selection device to select a particular item, e.g., a desired Team Member, displayed in the frame 800. Referring to FIGS. 3-4, the user component 310 may receive 428 a selection signal 322 from the user interface selection device 320 of an item listed in frame 800. For example, a user may use a mouse to point and click on an item listed in the container, or may use any other suitable method to indicate a selection of a listed item. The selected item may be indicated in frame 800 in any appropriate manner, such as by highlighting the background of the item in a contrasting color, bolding the textual representation, or in any other suitable manner. In the example query result illustrated in FIG. 8, a user may select 'Team Member 2' and/or may select the Team Member 2 icon.

The user may use the user interface selection device to move the container 800 relative to the other displayed containers, e.g., frames 500, 600 of FIG. 8. Referring to FIG. 4, if the user component receives 430 an indication that the container has been moved, the user component may determine 432 if the container 800 has been moved before a prior container.

A prior container may be a container that was created before the moved container, contains data items at a higher hierarchy or prior index of the database, or has a higher primacy than the moved container. In one example, as noted above, the position of the containers may indicate the primacy of the query index, e.g., the containers may be stacked, overlapped, or otherwise positioned to indicate the primacy of the query results displayed in each container. In some cases, it may be appropriate for the user component to associate a primacy value or other indicator with each container. As shown in FIG. 8, the frame 500 positioned above frame 600 may have a higher primacy than frame 600, and frame 600 positioned above frame 800 may have a higher primacy than frame 800. When the user moves the frame 800 before frame 600, as shown in FIG. 9, the user component may associate a new primacy with frame 800 which is higher or more than the present or newly associated primacy of frame 600. In this manner, a user may graphically adjust the primacy of the query series.

Positioning of a container before another container may be determined by the user component by comparing the relative positions of the containers. For example, if the primacy of the containers is indicated with a vertical stacking of the containers, as shown in FIG. 9, the user may move the frame 800 from the bottom (as shown in FIG. 8) to above frame 600 but below frame 500. In this manner, the user may indicate a desired pivot of the displayed data to have the Team Members at a higher query primacy than the Action Items. The user may use any appropriate method to move the container 800 between containers 500 and 600. For example, after selecting frame 800, the user may press an up button on a keyboard, select an increase primacy selector (not shown) in frame 800, and/or may click and drag frame 800 vertically above frame 600. The user may manually insert frame 800 between frames 500 and 600. However, the user component may include a 'snap to point' or any other suitable graphical assistance capability such that when the user drags the frame 800 before a prior frame such as frame 600, the user component may snap frame 800 between frames 500 and 600, automatically adjusting the vertical position of the frames to accommodate frame real estate. It is to be appreciated that other methods may be suitable to graphically indicate primacy and a change in primacy, such as adjusting the horizontal position of the containers, adjusting an overlap of the containers such as by bringing to the front or sending to the back selected containers, and the like.

It is also to be appreciated that the primacy of the containers may be graphically adjusted not by increasing the primacy of a container, but by reducing the primacy of a container. For example, relative movement of the containers may determine the relative primacy of the containers. For example, rather than moving the frame 800 before frame 600, a user may rather move frame 600 after frame 800. In either case, frame 800 is 'moved' before frame 600.

Relative movement of a container before an other, prior container may be measured by the user component by comparing the bottom, top, middle, exposed area if the containers overlap, or any other appropriate portion of the containers. In this manner, the user may graphically indicate a desired adjustment in the primacy of the query results displayed in the containers. If the user component detects or receives an indication that a frame has been moved but not moved before a prior frame, then the user component may maintain 438 the data results displayed in each of the frames.

In response to a relative movement of a container before a prior container, the user component may maintain the listing of items in any containers that do not have a change in position and/or primacy. For example, in the display shown in FIG. 9, frame 500 remains at the top of the stack, and thus, its primacy remains unchanged. Accordingly, the list of items 530 contained in the frame 500 may remain unchanged. However, those containers with a changed primacy (or position) may require an adjustment to reflect the changed primacy of the query results and display the desired data to the user.

The user component 310 of FIG. 3 may use any suitable method to pivot the data results about the indicated index based on the change in primacy. For example, the user component may manipulate items in associative memory and create a new list based on the new pivot index. As used herein, the tern 'retrieve' means accessing the data to obtain new results, accessing local memory to obtain new results, and modifying an existing list of items based on the query primacy.

With reference to FIG. 4, the user component may retrieve 434 a list of items for display in the adjusted position of the container having an increased primacy (or position), e.g., frame 800 of FIG. 9. More particularly, if there is an item selected in a prior container, (frame 500 in FIG. 9), the user component may retrieve items associated with the index of frame 800 which are also associated with the selected item(s) in the prior container(s). If there is no item selected in prior container, the user component may retrieve data items related only to the index of the frame 800. It is to be appreciated that other query parameter constraints may also be considered in computing the items to display in frame 800, such as predetermined query parameters or those parameters indicated in a prior or additional query by the user, e.g., an association with the user, range constraints, categorical constraints, and the like. The user component may then display 436 the retrieved data items in the newly positioned container having an increased primacy (frame 800). For example, as shown in FIG. 9, the user has selected Activity 2 in frame 500. Thus, when frame 800 is positioned between frame 500 and frame 600, the user component may retrieve and display all Team Members associated with the selected Activity 2. Thus, the list of items in frame 800 may be extended since it is no longer limited to the Team Members associated only with the Action Item 1 selected in frame 600 as shown in FIG. 8. More particularly, the constraint of any items selected in the container with a lesser primacy (frame 600) has been removed in computing the items to display in the container (frame 800) with the increased primacy.

Container 600 of FIG. 9 also has a changed primacy relative to its position and/or primacy of FIG. 8. Accordingly, the user component may retrieve 434 a list of items for display in the adjusted position of the container having a decreased primacy (or position), e.g., frame 600 of FIG. 9. More particularly, if there is an item selected in one or more prior containers, (frame 500 and frame 800), the user component may retrieve items associated with the index of frame 600 which are also associated with the selected item(s) in the prior container(s). If there is no item selected in a prior container, the user component may retrieve data items related only to the index of the frame 600, e.g., all Action Items. It is to be appreciated that other query parameter constraints may also be considered in computing the items to display in frame 600, such as predetermined query parameters or those parameters indicated in a prior or additional query by the user, e.g., an association with the user, range constraints, categorical constraints, and the like. The user component may then display 436 the retrieved data items in the newly positioned container (frame 600) having a decreased primacy. For example, as shown in FIG. 9, the user has selected Activity 2 in frame 500 and has selected Team Member 2 in frame 800. Thus, when frame 600 is positioned below or after frame 800, the user component may retrieve and display all Action Items associated with the selected Activity 2 and Team Member 2. Thus, the list of items in frame 600 may be more constrained since it is not only constrained by the selected Activity of frame 500 as shown in FIG. 8, but is also constrained by selected Team Member of frame 800 as shown in FIG. 9. In this manner, the constraint of any items selected in a container having an increased primacy (frame 800) has been added in computing the items to display in the container (frame 600) with the decreased primacy.

Figure 10:
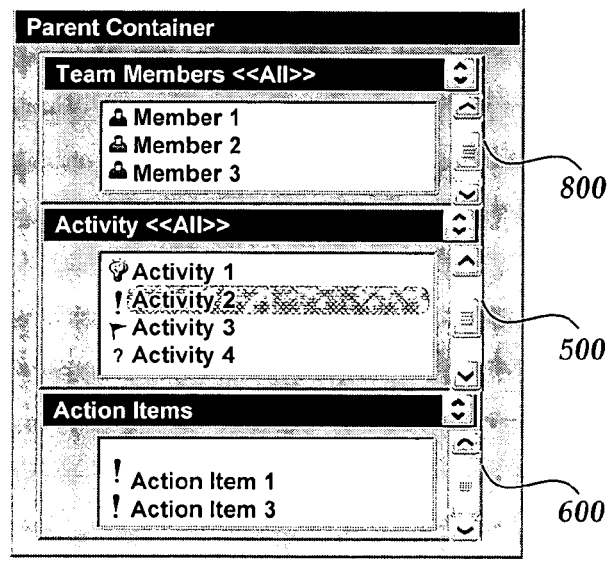
FIG. 10 is another example display of a pivoted query result of the display of FIG. 7 in one embodiment.

In some cases, a container may be moved before more than one prior frame. For example, as shown in FIG. 10, the frame 800 may be moved before one or more prior displayed frames (those frames having a higher primacy), which in FIG. 9 are frame 500 and frame 600. With reference to FIG. 4, in response to receiving 430 an indication that the frame 800 has been moved before a prior frame, the user component may retrieve 434 a data set to display the query results in the container with an increased primacy (frame 800 in FIG. 10). The user component may also retrieve 434 a data set to display the query results in those containers with a decreased primacy (frame 500 and frame 600 in FIG. 10).

As shown in FIG. 10, the user has selected no Team Member item in frame 800 and has moved frame 800 before both frame 500 and frame 600. In response, the user component may remove the prior constraints from frame 500 and frame 600 on the data displayed in frame 800. For example, the user component may generate a new query to retrieve the additional index (Team Member) items from the database, or may retrieve the additional items from memory. In this manner, the user component may display all Team Member items in frame 800 of FIG. 10, or the items may be further constrained by additional query parameters as noted above including range limits, categorical constraints, and the like.

The user component may modify the data displayed in the container to match the context and primacy of the container. For example, as shown in FIG. 10, the displayed Team Member items has been expanded to include <<All>> of the items, however, the role of each member has been removed. More particularly, since each item in the indicated index of the frame (Team Members) may be associated with one or more items from the other displayed index (Roles), the context may no longer be relevant in the adjusted primacy and position of the container. Alternatively, the user component may list the primary or all items such as roles associated with each Team Member item.

In further response to the relative movement of frame 800 before frame 500 and frame 600, in FIG. 10, the user component may retrieve and display appropriate lists of items in any containers having a decrease in primacy, e.g., frame 500 and frame 600. For example, the user component may add any constraints from frame 800 to limit the display of items in frame 500 and frame 600. For example, the user component may generate a new query to retrieve the additional Activity and/or Action Item items from the database, or may retrieve the additional items from memory. In this manner, the user component may further constrain the items displayed in frame 500 and 600. Moreover, the relative movement of the containers may also expand the item lists in containers having a decrease in their primacy, depending on whether or not an item is selected in a prior container. For example, as shown in FIG. 10, the user has not selected a Team Member item in frame 800, as such, the subsequent frame 500 may continue to display all Activities and/or may be expanded in any suitable manner. Alternatively, the displayed items may be further constrained by additional query parameters as noted above including range limits, categorical constraints, and the like. It is to be appreciated that the displayed data may be further adjusted by manipulating the relative positions of the displayed containers to automatically generate queries and/or retrieve desired data items from an index of a database.

Additional functionality may be added to the containers containing the query results as may be suitable. For example, the listed items in one or more containers may allow a user to select a desired item and initiate an action against that item. The action initiated may be any appropriate action against an item, such as modification of the data item itself, removal of the data item from the database, begin an communication session, flag the item, and the like. Multiple action selections may be sorted or grouped in any appropriate manner including categories, alphabetically, recent user, popularity of use, and the like. In one example, actions such as flagging items may be sorted by location to indicate the place to take a future action such as 'in the office', 'at home', 'in the car', and the like. In another example, actions such as flags or action initiations may be indicated by a device categorization such as email communication, instant message communication, phone, face to face, and the like. The indication of action may be stored as another index of the database 100 as appropriate and may be associated with the item.

Operation of the action may be supported by the user component and/or may be alternatively and/or additionally supported by another, external component such as a communication application and the like. The external application supporting the action may be automatically initiated by the user component in response to selection of an action associated with an item. The available actions may be accessed in any suitable manner, such as through activation of the icon associated with the item, a pull down menu made available upon selection of an item, an action selector such as a button on the container and/or the parent container, and any suitable access selector. The action may also be supported within the context of the displayed data. For example, if the user selects Member 2 as shown in FIG. 9, the user may be presented with a pull-down menu allowing the user to begin various forms of communication with the selected Team Member, e.g., telephone, email, instant messaging, facsimile, and the like. If the user selects an instant message (IM) communication, an IM frame supported by an IM application may be integrated into and/or associated with the Team Member frame to illustrate the context of the IM session with the displayed items, and selected Team Member 2.

External actions or events from other devices and/or applications may affect the data displayed in containers of the display system. For example, an event may be detected by the user component 310, and in response, may automatically select or indicate a displayed item associated with the event by highlighting the textual representation of the item, and the like. If the item is not displayed, the user component may retrieve the indicated item and display it in an existing container having the same associated index, or a new container associated with an index or dimension of the item. The user component may automatically move the container containing the automatically selected item to the highest primacy of the displayed containers. As a result, the context of the data items display may be automatically adjusted based on external events. Examples of events which may be suitable to modify the display of data items may include incoming communications related to and/or associated with a data item, a change in status and/or value of a data item in the database, and the like.

A container containing items from a database may include a selector which may constrain the data items displayed in the container. Predetermined query parameters may be made available to the user through suitable selectors such a pull down menu, dialog, buttons and the like. For example, the listed data may be constrained to those items associated with the user with selection of a user icon. Moreover, the container containing items may include a selector which may expand the data items displayed in the container. For example, the displayed data items may be constrained if there is a selected item in a prior container or a query parameter constraint, as discussed above. To remove the constraint, the user may select a remove selected item selector which may remove all selected items in all containers and/or may remove selection of items in only an indicated container. The container may also have a 'show all' button or other suitable selector which allows a user to remove all constraints on the listed data items other than the index constraint of the container containing the data items.

Figure 11:
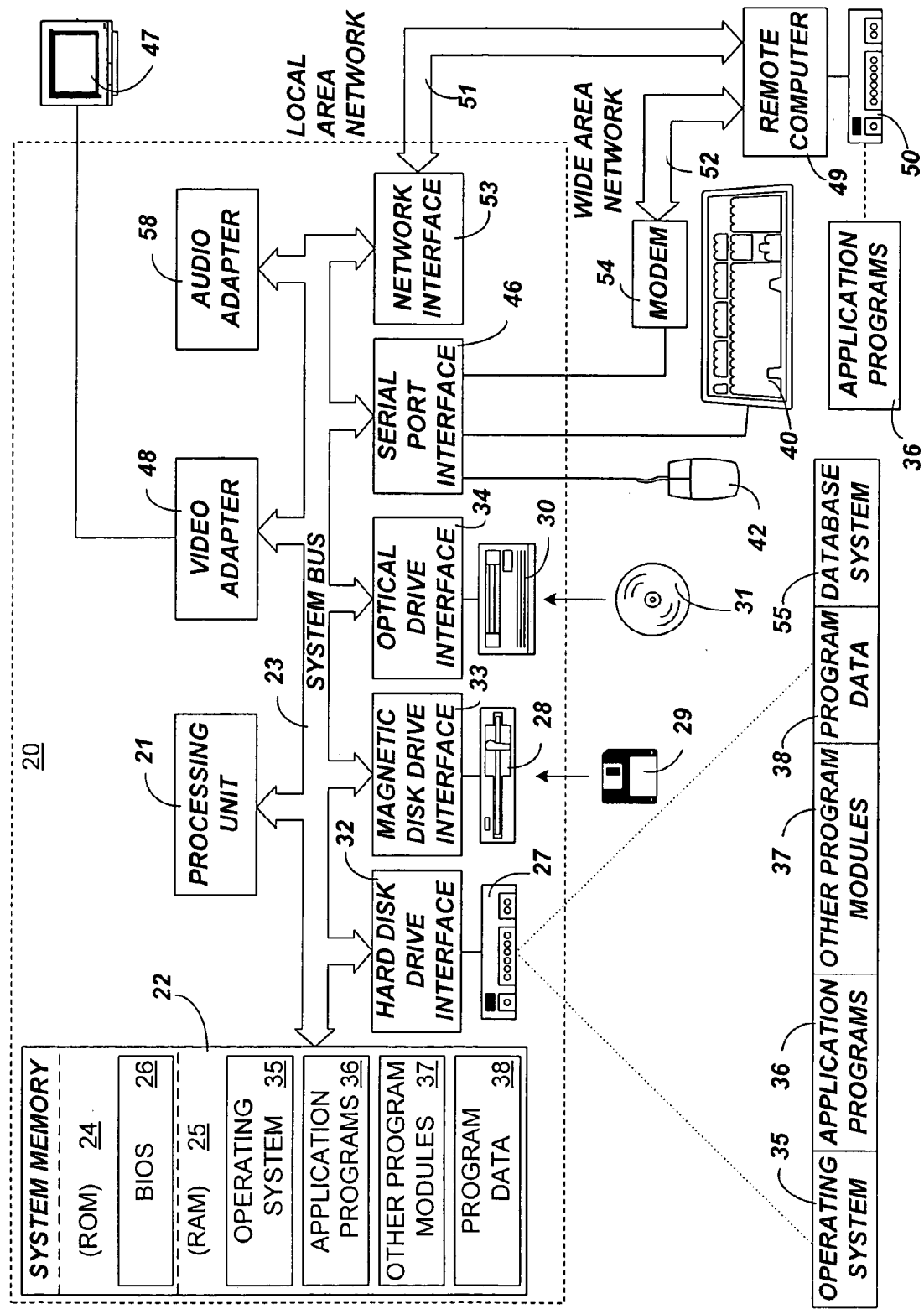
FIG. 11 is a schematic diagram of an example computer system in one embodiment.

FIG. 11 illustrates an example of a suitable computing system environment 20 on which any combination of the user component 310, query engine 314, database 100, user interface device 320 of the display system 300 may be implemented. The computing system environment 20 is only one example of a suitable computing environment and is not intended to suggest any limitation as to the scope of use or functionality of the management system 100. Neither should the computing environment 20 be interpreted as having any dependency or requirement relating to any one or combination of components illustrated in the exemplary operating environment 20.

The display system 300 is operational with numerous other general purpose or special purpose computing system environments or configurations. Examples of well known computing systems, environments, and/or configurations that may be suitable for use with the display system 300 include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems, or devices, and the like.

The display system 300 may be described in the general context of computer-executable instructions, such as program modules, being executed by a computer. Generally, program modules include routines, programs, objects, components, data structures, etc. that perform particular tasks or implement particular abstract data types. The display system 300 may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the display system 300 includes a general purpose computing device in the form of a computer 20. Components of computer 20 may include, but are not limited to, a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

Computer 920 typically includes a variety of computer readable media. Computer readable media can be any available media that can be accessed by computer 920 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 920. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 22 includes computer storage media in the form of volatile and/or nonvolatile memory such as read only memory (ROM) 24 and random access memory (RAM) 25. A basic input/output system 26 (BIOS), containing the basic routines that help to transfer information between elements within computer 20, such as during staff-up, is typically stored in ROM 24. RAM 25 typically contains data and/or program modules that are immediately accessible to and/or presently being operated on by processing unit 21. By way of example, and not limitation, FIG. 11 illustrates operating system 35 application programs 36 other program modules 37 and program data 38.

The computer 20 may also include other removable/non-removable, volatile/nonvolatile computer storage media. By way of example only, FIG. 11 illustrates a hard disk drive 27 that reads from or writes to non-removable, nonvolatile magnetic media, a magnetic disk drive 28 that reads from or writes to a removable, nonvolatile magnetic disk 29 and an optical disk drive 30 that reads from or writes to a removable, nonvolatile optical disk 31 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 27 is typically connected to the system bus 23 through a non-removable memory interface such as interface 32 and magnetic disk drive 28 and optical disk drive 30 are typically connected to the system bus 23 by a removable memory interface, such as interface 33.

The drives and their associated computer storage media discussed above and illustrated in FIG. 11, provide storage of computer readable instructions, data structures, program modules and other data for the computer 20. In FIG. 11, for example, hard disk drive 27 is illustrated as storing operating system 35 application programs 36 other program modules 37 and program data 38. Note that these components can either be the same as or different from the operating system, application programs, other program modules, and program data in RAM 25. A user may enter commands and information into the computer 20 through user interface selection devices such as a keyboard 40 and pointing device 42, commonly referred to as a mouse, trackball or touch pad. Other input devices (not shown) may include a microphone, joystick, game pad, satellite dish, scanner, or the like. These and other input devices are often connected to the processing unit 21 through a user input interface 46 that is coupled to the system bus, but may be connected by other interface and bus structures, such as a parallel port, game port or a universal serial bus (USB). A monitor 47 or other type of display device is also connected to the system bus 23 via an interface, such as a video interface 48. In addition to the monitor, computers may also include other peripheral output devices such as speakers, which may be connected through an audio adapter 58.

The computer 20 may operate in a networked environment using logical connections to one or more remote computers, such as a remote computer 49. The remote computer 49 may be a personal computer, a server, a router, a network PC, a peer device or other common network node, and typically includes many or all of the elements described above relative to the computer 20, although only a memory storage device 50 has been illustrated in FIG. 11. The logical connections depicted in FIG. 11 include a local area network (LAN) 51 and a wide area network (WAN) 52, but may also include other networks. Such networking environments are commonplace in offices, enterprise-wide computer networks, intranets and the Internet.

When used in a LAN networking environment, the computer 20 is connected to the LAN 51 through a network interface or adapter 53. When used in a WAN networking environment, the computer 20 typically includes a modem 54 or other means for establishing communications over the WAN 52 such as the Internet. The modem 54 which may be internal or external, may be connected to the system bus 23 via the user input interface 46, or other appropriate mechanism. In a networked environment, program modules depicted relative to the computer 20, or portions thereof, may be stored in the remote memory storage device. By way of example, and not limitation, FIG. 11 illustrates remote application programs 36 as residing on memory device 50. It will be appreciated that the network connections shown are exemplary and other means of establishing a communications link between the computers may be used.

It is to be appreciated that the combination of components of the computer 20 are an example only and many other types and/or combination of components may be appropriate. For example, computer 20 may be a small form device which may include components additional to those discussed above, and may not include all of the components discussed above. Example small form devices may include cellular telephones, palm devices, SPOT.™. watches available from Microsoft Corp., music players such as MP3 players, and any other handheld computer device.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. In a computer system having a graphical user interface, a display, and a user interface selection device, a method comprising the steps of:
    (a) displaying a first set of data associated with a first index of a hierarchical data store in a first frame;
    (b) receiving a first selection signal indicative of the user interface selection device selecting a first item of the first set of data;
    (c) in response to the first selection signal, retrieving a second set of data from the data store associated with a second index of the data store, the second set of data being associated with the first item, wherein the second index corresponds to a next tier down from the first index of the data store;
    (d) displaying the second set of data in a second frame distinct from the first frame;
    (e) receiving a second selection signal indicative of the user interface selection device selecting a second item of the second set of data;
    (f) in response to the second selection signal, retrieving a third set of data from the data store associated with the second item and with a third index of the data store, wherein the third index corresponds to a next tier down from the second index of the data store,
    (g) displaying the third set of data in a third frame distinct from the first and second frames; and
    (h) associating a first primacy with a position of the first frame and associating a second primacy with a position of the second frame, wherein the second frame is moved in its entirety before the first frame using the user interface selection device to pivot the displayed sets of data in the first and second frames, thereby reordering the first primacy in relation to the second primacy.

2. The method of claim 1, wherein the first selection signal indicates a point and click of the user interface selection device proximate the first item.

3. The method of claim 1, further comprising associating the first frame with the second frame.

4. The method of claim 3, further comprising displaying the second frame as a stackable container associated with the first frame.

5. The method of claim 1, further comprising receiving a third selection signal indicative of the user interface selection device relatively moving the second frame before the first frame, and in response to the third selection signal, retrieving a fourth set of data associated with the second item and the first index, and displaying the fourth set of data in the first frame.

6. The method of claim 5, further comprising in response to the third selection signal, increasing a primacy associated with the second frame and decreasing a primacy associated with the first frame.

7. The method of claim 1, further comprising receiving a fifth selection signal indicative of the user interface selection device selecting a third item of the third set of data, receiving a sixth selection signal indicative of the user interface selection device relatively moving the third frame before the second frame, and in response to the sixth selection signal, retrieving a fifth set of data associated with the third item and the second index, and displaying the fifth set of data in the second frame.

8. The method of claim 7, wherein the sixth selection signal is indicative of the user interface selection device relatively moving the third frame before the first frame, and in response to the sixth selection signal, retrieving a sixth set of data associated with the third item and the first index, and displaying the sixth set of data in the first frame.

9. The method of claim 7, further comprising receiving an eighth selection signal indicative of the user interface device selecting an action to be taken with reference to the third item.

10. The method of claim 9, further comprising in response to the eighth selection signal, initiating an external application to perform the selected action.

11. The method of claim 1, further comprising detecting an event and automatically selecting an item in the second frame.

12. The method of claim 11, further comprising automatically relatively moving the second frame before the first frame.

13. The method of claim 1, wherein a title bar of the first frame includes an index label of the first index.

14. The method of claim 13, further comprising receiving a seventh selection signal indicative of the user interface selection device selecting a frame minimizer selector of the first frame, and in response to the seventh selection signal, decreasing a size of the first frame to exclude display of unselected items of the first set of data.

15. The method of claim 14, wherein decreasing the size includes decreasing a vertical size of the first frame and maintaining a horizontal size of the first frame.

16. The method of claim 14, wherein decreasing the size includes displaying the title bar of the first frame and excludes display of items of the first set of data.

17. The method of claim 14, wherein decreasing the size includes replacing the first frame with a first frame icon at a relative position of the first frame.

18. The method of claim 1, wherein the first frame and the second frame are display frames compatible with Windows graphical user interface software.

19. The method of claim 1, wherein the data store includes a hierarchical database, and the first index indicates a first tier of the hierarchical database, and the second index indicates a second tier of the hierarchical database lower than the first tier.

20. The method of claim 1, further comprising in response to the first selection signal, decreasing a size of the first frame.

21. The method of claim 1, wherein the data store includes a multidimensional database, and the first index indicates a first dimension of the multidimensional database and the second index indicates a second dimension of the multidimensional database.

22. The method of claim 1, wherein the second primacy is less than the first primacy.

23. A computer readable storage medium having computer executable instructions for performing steps comprising:
   (a) displaying in a first frame a first list of items associated with a first index of a multidimensional data store;
   (b) receiving a first indication of a selection of a first item in the first list of items;
   (c) in response to the first indication, displaying in a second frame a second list of items associated with a second index of the multidimensional data store and associated with the first item, wherein the second index corresponds to a next tier down from the first index of the multidimensional data store;
   (d) receiving a second indication of a selection of a second item in the second list of items;
   (e) in response to the second indication, displaying in a third frame a third list of items associated with a third index of the multidimensional data store and associated with the second item, wherein the third index corresponds to a next tier down from the second index of the multidimensional data store; and
   (f) associating a first primacy with a position of the first frame and associating a second primacy with a position of the second frame, wherein the second frame is moved in its entirety before the first frame using a user interface selection device to pivot the displayed lists of items in the first and second frames, thereby reordering the first primacy in relation to the second primacy.

24. The computer readable storage medium of claim 23, wherein the second index is predetermined.

25. The computer readable storage medium of claim 24, wherein the second index is hierarchically at a lower level than the first index.

26. The computer readable storage medium of claim 23, wherein the second index is selected by a user.

27. The computer readable storage medium of claim 23, further comprising displaying the second frame as a stackable container associated with the first frame.

28. The computer readable storage medium of claim 23, further comprising receiving a third indication of relative movement of the second frame before the first frame, and in response to the third indication, retrieving a fourth set of data associated with the second item and the first index, and displaying the fourth set of data in the first frame.

29. The computer readable storage medium of claim 28, further comprising in response to the third indication, increasing a primacy associated with the second frame, and decreasing a primacy associated with the first frame.

30. The computer readable storage medium of claim 23, further comprising receiving a fifth indication of a selection of a third item of the third set of data, receiving a sixth indication of relative movement of the third frame before the second frame, and in response to the sixth indication, retrieving a fifth set of data associated with the third item and the second index, and displaying the fifth set of data in the second frame.

31. The computer readable storage medium of claim 30, wherein the sixth selection signal indication indicates relative movement of the third frame before the first frame, and in response to the sixth indication, retrieving a sixth set of data associated with the third item and the first index, and displaying the sixth set of data in the first frame.

32. The computer readable storage medium of claim 30, further comprising receiving an eighth indication of an action to be taken with reference to the third item.

33. The computer readable storage medium of claim 23, wherein the first frame and the second frame are display frames compatible with Windows graphical user interface software.

34. A computer readable storage medium having computer executable components comprising:
   (a) a database component for storing a multidimensional data store including at least a first index, a second index, and a third index, wherein the second index corresponds to a next tier down from the first index of the multidimensional data store, and wherein the third index corresponds to a next tier down from the second index of the multidimensional data store;
   (b) a query engine component for retrieving a data set associated with at least one of the first index, the second index, and the third index of the multidimensional data store;
   (c) a display component for displaying each retrieved data set in a distinct container, each container having a display position indicating a primacy of the retrieved data set, wherein the relative display positions of two or more containers are moved in their entirety using a user interface selection device to pivot the displayed data sets in each container, thereby reordering the primacy associated with the two or more containers; and
   (d) a user component for receiving an indication of a selected item in a container having a first primacy, wherein the query engine component is capable of retrieving a data set associated with the third index in response to an indication of a selection received by the user component of an item in a container for a data set associated with the second index.

35. The computer readable storage medium of claim 34, wherein each container is a frame including a title bar including a frame minimizer selector, and a scroll bar indicator.

36. The computer readable storage medium of claim 35, wherein each frame is a display frame compatible with Windows graphical user interface software.

37. The computer readable storage medium of claim 34, wherein in response to the indication of a selected item, the user component modifies the data set in each container having a lesser primacy to be associated with the selected item and at least one of the first index and the second index.

38. The computer readable storage medium of claim 34, wherein each container is a stackable container.

39. The computer readable storage medium of claim 34, wherein the user component is constructed to receive an indication of a change of primacy of a selected container.

40. The computer readable storage medium of claim 39, wherein the indication of a change of primacy includes an indication of the selected container being relatively moved before a container having a higher primacy.

41. The computer readable storage medium of claim 39, wherein in response to the indication of a change of primacy, the user component modifies the data set in the selected container.

42. The computer readable storage medium of claim 41, wherein in response to the indication of a change of primacy, the user component decreases the primacy of each container positioned after the selected container.

43. The computer readable storage medium of claim 42, wherein in response to the indication of a change of primacy, the user component modifies the data set in each container having a decreased primacy.

44. A display device comprising:
a display having rendered thereon a query result for a query to a multidimensional database, the query result comprising:
(a) a first query result contained in a first frame, the first query result comprising at least a portion of a first dimension of the multidimensional database;
(b) a second query result in a second frame distinct from the first frame, the second query result comprising at least a portion of a second dimension of the multidimensional database, wherein the second dimension corresponds to a next tier down from the first dimension of the multidimensional database;
(c) a third query result in a third frame distinct from the first and second frames, the third query result comprising at least a portion of a third dimension of the multidimensional database, wherein the third dimension corresponds to a next tier down from the second dimension of the multidimensional database, wherein the third query result is displayed in response to a selection of an item in the second frame corresponding to the second query result,
wherein a position of the first frame indicates a first primacy associated with the first query result, and a position of the second frame indicates a second primacy associated with the second query result, wherein the relative positions of the first frame and the second frame are moved in their entirety using a user interface selection device to pivot the rendered first and second query results in the first and second frames, thereby reordering the first primacy in relation to the second primacy.

45. The display device of claim 44, wherein the second primacy is lower than the first primacy.

46. The display device of claim 44, wherein each item of the second query result satisfies a query parameter.

47. The display device of claim 46, wherein the query parameter is an item indicated in the first query result.

48. The display device of claim 46, wherein the query parameter is a constraint on items associated with the second dimension.

49. The display device of claim of claim 44, wherein each frame is compatible with Windows® graphical user interface software.

50. The display device of claim 44, wherein each fame is a stackable container.

51. The display device of claim 44, wherein in response to a relative movement of the second frame before the first frame, the second query result is modified to remove any constraints indicated in the first frame.

52. The display device of claim 51, wherein response to the relative movement of the second frame, the first query result is modified to add any constraints indicated in the second frame.

53. A method including:
(a) displaying a first container containing a first set of data items in accordance with a first query including a first index of a database;
(b) associating a first primacy with a position of the first container;
(c) displaying a second container containing a second set of data items in accordance with a second query including a second index of the database, wherein the second index corresponds to a next tier down from the first index of the database;
(d) associating with a position of the second container a second primacy less than the first primacy;
(e) receiving a second indication of a selection of an item in the second set of data items;
(f) in response to the second indication, displaying a third container containing a third set of data items in accordance with a third query including a third index of the database, wherein the third index corresponds to a next tier down from the second index of the database;
(g) receiving a first indication that the second container has moved in its entirety relatively before the first container;
(h) in response to the first indication, reordering the first primacy in relation to the second primacy so that the first primacy is less than the second primacy;
(i) in response to the first indication, pivoting the first and second sets of data about the second index; and
(j) displaying the pivoted first and second sets of data.

54. The method of claim 53, wherein the second indication is received from a user interface selection device selecting the item.

55. The method of claim 53, wherein the second indication is received from a user component detecting a predetermined event.

56. The method of claim 53, further comprising, in response to the first indication, displaying in the first frame a fourth set of data items associated with the first index and the selected item.

57. The method of claim 53, further comprising receiving a third indication that an action is desired associated with the selected item.

58. The method of claim 57, further comprising in response to the third indication, displaying an action container associated with the second frame.

59. The method of claim 58, further comprising in response to the third indication accessing an external application to provide the action.

60. The method of claim 53, further comprising generating the first query and the second query based upon a predetermined hierarchical relationship of the first index and the second index.

61. A computer readable storage medium having computer executable instructions for performing steps comprising:
(a) displaying in a first container a first list of items associated with a first index of a multidimensional database;
(b) associating a first primacy with a display position of the first container;
(c) displaying in a second container a second list of items associated with a second index of the multidimensional database, wherein the second index corresponds to a next tier down from the first index of the multidimensional database;
(d) associating a second primacy with a display position of the second container, the second primacy being less than the first primacy;
(e) receiving a second indication of a selection of an item in the second container, and in response to the second indication, displaying a third list of items in a third container being associated with a third index of the multidimensional database, wherein the third index corresponds to a next tier down from the second index of the multidimensional database, wherein the third list of items in the third container is associated with a third primacy lower than the second primacy; and (f) storing one or more values corresponding to the first primacy and the second primacy, wherein the relative display positions of the first container and the second container are moved in their entirety using a user interface selection device to pivot the displayed lists of items in the first and second containers, thereby reordering the first primacy in relation to the second primacy so that the first primacy is less than the second primacy.

62. The computer readable storage medium of claim 61, wherein the first index and the second index are indicated by a user.

63. The computer readable storage medium of claim 61, wherein the first index and the second index are predetermined.

64. The computer readable storage medium of claim 61, further comprising receiving a first indication that the second container has moved relatively before the first container, and in response to the first indication, associating the first primacy with the second container and associating the second primacy with the first container.

65. The computer readable storage medium of claim 61, wherein each container is compatible with Windows graphical user interface software.

66. The computer readable storage medium of claim 61, further comprising receiving a third indication that the third container has moved relatively before a container having a higher primacy, and in response to the third indication, retrieving a list of data items for display in each container positioned after the third container.

67. The computer readable storage medium of claim 66, further comprising, in response to the third indication, associating a fourth primacy with the third container less than the third primacy, and decreasing a primacy associated with each container positioned below the third container.

68. The computer readable storage medium of claim 67, further comprising expanding the list of data items in the third container to exclude constraints indicated in containers having a lower primacy than the fourth primacy.

69. In a computer system having a graphical user interface including a display and a user interface selection device, a method comprising the steps of:

(a) displaying a first set of data associated with a first index from a database in a first container;

(b) associating a first primacy with a position of the first container on the display;

(c) receiving a first selection signal indicative of the user interface selection device selecting a first item of the first set of data;

(d) in response to the first selection signal, retrieving a second set of data associated with a second index from the database, the second set of data being associated with the first item, wherein the second index corresponds to a next tier down from the first index of the database;

(e) displaying the second set of data in a second container distinct from the first container;

(f) receiving a second selection signal indicative of a selection of a second item of the second set of data, and in response to the second selection signal, displaying a fourth set of data in a third container being associated with a third index of the database, wherein the third index corresponds to a next tier down from the second index of the database;

(g) associating a second primacy with a position of the second container on the display, the second primacy being less than the first primacy, wherein the relative positions of the first container and the second container are moved in their entirety using the user interface selection device to pivot the displayed sets of data in the first and second containers, thereby reordering the first primacy in relation to the second primacy so that the first primacy is less than the second primacy.

70. The method of claim 69, wherein each of the first and second containers is a frame including a title bar and a scroll bar indicator.

71. The method of claim 69, wherein the first set of data is associated with a first index of the database and the second set of data is associated with a second index of the database.

72. The method of claim 69, further comprising receiving a first indication that the second container has moved relatively before the first container, and in response to the first indication, associating the first primacy with the second container and associating the second primacy with the first container.

73. The method of claim 72, further comprising expanding the second set of data to remove an indicated constraint associated with the first container.

74. The method of claim 73, further comprising retrieving a list of data items for display in each container positioned after the third container.

75. The method of claim 72, further comprising limiting the first set of data to include an indicated constraint associated with the second container.

* * * * *